United States Patent

Stinnette

Patent Number: 5,195,699
Date of Patent: Mar. 23, 1993

[54] APPARATUS FOR REMOVING LINE FROM A SPOOL

[75] Inventor: Harry H. Stinnette, Brandon, Fla.

[73] Assignees: Julian Fender; Betty L. Fender, both of Brandon, Fla.

[21] Appl. No.: 841,155

[22] Filed: Feb. 25, 1992

Related U.S. Application Data

[63] Continuation-in-part of Ser. No. 731,553, Jul. 17, 1991, abandoned.

[51] Int. Cl.⁵ .............................................. A01K 89/01
[52] U.S. Cl. .................................. 242/322; 242/118.6
[58] Field of Search .................. 242/118.4, 118.6, 115, 242/116, 2, 322, 227, 228, 229

[56] References Cited

U.S. PATENT DOCUMENTS

| | | | |
|---|---|---|---|
| 2,486,514 | 11/1949 | Boehnke | 242/2 |
| 3,307,800 | 3/1967 | Macedo | 242/118.6 X |
| 4,196,864 | 4/1980 | Cole | 242/118.6 X |
| 4,462,555 | 7/1984 | Olson et al. | 242/118.6 |

FOREIGN PATENT DOCUMENTS 4619 of 1893 United Kingdom ............. 242/118.6

Primary Examiner—Stanley N. Gilreath
Attorney, Agent, or Firm—Joseph C. Mason, Jr.; Ronald E. Smith

[57] ABSTRACT

An improved spool of the type used in fishing reels facilitates removal of old line from the spool so that the time required to replace a worn line is reduced from nearly half an hour to just a few moments. The same improved spool also has utility in removing line from conventional spools. The improved spool is built in two parts that are detachably secured to one another and quickly releasable from one another. The central part of the spool has a hyperbolic contour which serves to wind the line into a compact coil so that the removed line is easily stored in a small space for subsequent recycling or appropriate disposal.

1 Claim, 3 Drawing Sheets

APPARATUS FOR REMOVING LINE FROM A SPOOL

This is a continuation-in-part of copending application Ser. No. 07/731,553 filed on Jul. 17, 1991, now abandoned.

TECHNICAL FIELD

This invention relates, generally, to a spool design that facilitates the removing of a coiled line therefrom. More particularly, it relates to a split fishing reel spool that eliminates the need to remove line from the spool by hand.

BACKGROUND ART

Many people enjoy fishing, but no one enjoys changing fishing lines. A typical bass fishing line is about one hundred fifty meters in length, and it takes between twenty to thirty minutes to change. Lines of the length used in deep sea fishing are of course much longer and take even longer to change.

All over the world, people remove old fishing line from spools by hand. By the time the process is over, a large mound of unspooled, disorderly line is at the person's feet. Many people thoughtlessly leave the mess where it lies, or toss it into the body of water being fished, and birds and other life forms eventually become tangled therein and die. More thoughtful people attempt to dispose of the tangled mess in a more responsible way, but the large size of the unspooled mound of thread makes disposal difficult and inconvenient.

Professionals and active amateurs change their lines every couple of tournaments, or every couple of weeks. Many professionals and active amateurs own multiple fishing rods, so the line changing task becomes a major chore for those people.

Thus, there is a clear need for a device that will quickly remove long lengths of fishing line from spools. The ideal device would not only remove a line quickly, it would remove the line in an orderly fashion so that the removed line would be tightly wound and compact, just like a new line from the factory. Such a small, neat line would be easy to recycle or dispose of properly; the fisher could simply stick the small line into a pocket, for example, for temporary storage.

If such a device existed, people who fish would enjoy their job or hobby more, and would be able to spend more time doing what they like and less time removing lines.

More importantly, the killing of birds and other wildlife by discarded mounds of monofilament line would be ended.

The prior art, when considered as a whole in accordance with the requirements of law, neither teaches nor suggests to those of ordinary skill in this art how the age-old method of removing fishing line from a spool by hand could be improved. Nor does the art contain any suggestions as to how a long length of line could be removed and simultaneously placed into a small coiled configuration to facilitate its convenient storage, disposal, or reuse.

DISCLOSURE OF INVENTION

A conventional spool is modified in two significant, heretofore unknown ways.

First, the spool is made in two separable parts. Snap fit and quick release means are provided so that the two separable parts may be quickly snapped together when a new line is put onto the spool and quickly separated when an old line is taken from the spool. The location of the parting line between the two parts of the spool is believed to be quite critical.

A change in the contour of a conventional spool is the second modification. In conventional spools, a cylindrical member is bounded at its opposite ends by disc-shaped end members. Importantly, the known cylindrical member has a uniform diameter along its extent. Thus, when viewed in side elevation, it presents a substantially flat profile.

The novel spool includes a central part that is not of cylindrical structure. Instead, the central part has an increased diameter near a first end, and the diameter thereof gradually diminishes along the length of the spool down to the diameter of a conventional, unmodified spool. Thus, when seen in side elevation, the central part has an arcuate or hyperbolic configuration. This causes the line to coil about itself in a manner that keeps the coil intact when it is removed from the spool. The spool does not rotate; a rotatably mounted line-coiling means winds the line around the spool in the well known way.

To change a worn line, the line is reeled in conventionally so that it is coiled about the novel spool. A quick release means is then activated to allow the spool to be separated into two parts, and the coiled line is simply lifted therefrom. Due to the unique contour of the spool, the coiled line retains its compact configuration and the individual removing the line can simply deposit the compact old line into a pocket, tackle box, or other suitable storage means other than the ground or the adjacent body of water. The entire procedure takes no more than a few seconds.

The novel spool may also be used as a tool form removing old, frayed, or otherwise deteriorated line from conventional spools. The novel spool is first emptied, i.e., any line therein is removed. The leading end of the line to be removed from a conventional spool is then coiled about the novel spool for a few turns and overlapped so that it engages the novel spool. The line is then rotated about the spool in the well known way, and this action feeds all of the worn line from the conventional spool onto the novel spool in just a few seconds. The line is then removed from the novel spool in the manner described above.

Thus, the novel spool may form a part of a fishing rod, thereby saving its user from the time-consuming chore of removing line by hand, and it may be used as a tool to remove lines from conventional spools, thereby saving the users of conventional spools from the line-changing chore.

The primary object of the present invention is to eliminate the chore of fishing line removal by hand, thereby eliminating the most disliked chore of those who fish.

Another object is to accomplish the foregoing object with an apparatus the manufacture of which adds no appreciable additional expense to the making of a fishing reel.

Another object is to provide a device that reduces the time required to change a line from nearly half an hour to just a few moments.

Still another object is to eliminate the killing of wildlife by discarded fishing line.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

BEST MODES FOR CARRYING OUT THE INVENTION

Figure 1:
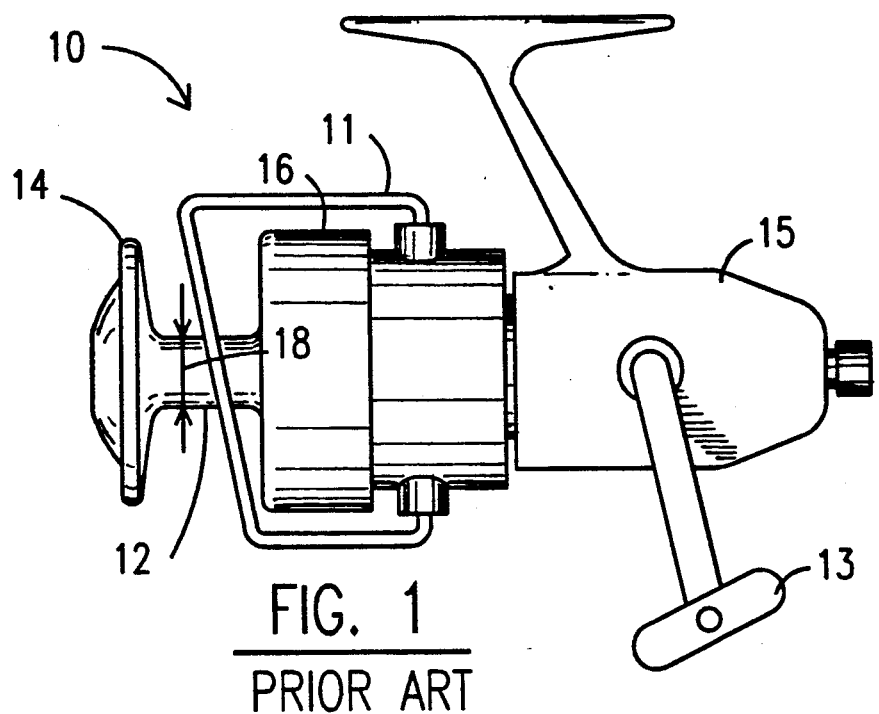
FIG. 1 is a side elevational view of a prior art spool.

Referring first to FIG. 1, it will there be seen that a fishing reel apparatus of the prior art is denoted as a whole by the reference numeral 10.

Apparatus 10 includes a spool having a cylindrical central part 12 and disc-shaped end plates 14, 16 which are fixedly secured by suitable means to the opposite ends of said central part 12, or integrally formed therewith as shown. Note that the diameter 18 (not a parting line) of central part 12 is uniform along the longitudinal extent thereof, and that the respective diameters of the end plates are greater than the diameter of the central part. The means for coiling a line about the spool is denoted 11 as a whole; the spool is non-rotatable and the line-coiling means 11 spins about it upon rotation of handle 13 in the well-known way. Note that the spool, the line coiling means 11, and the handle 13 are mounted to a conventional frame or housing 15, with the spool being non-rotatably mounted with respect to the housing and the line coiling means and handle being rotatably mounted with respect to said housing as aforesaid.

Figure 2:
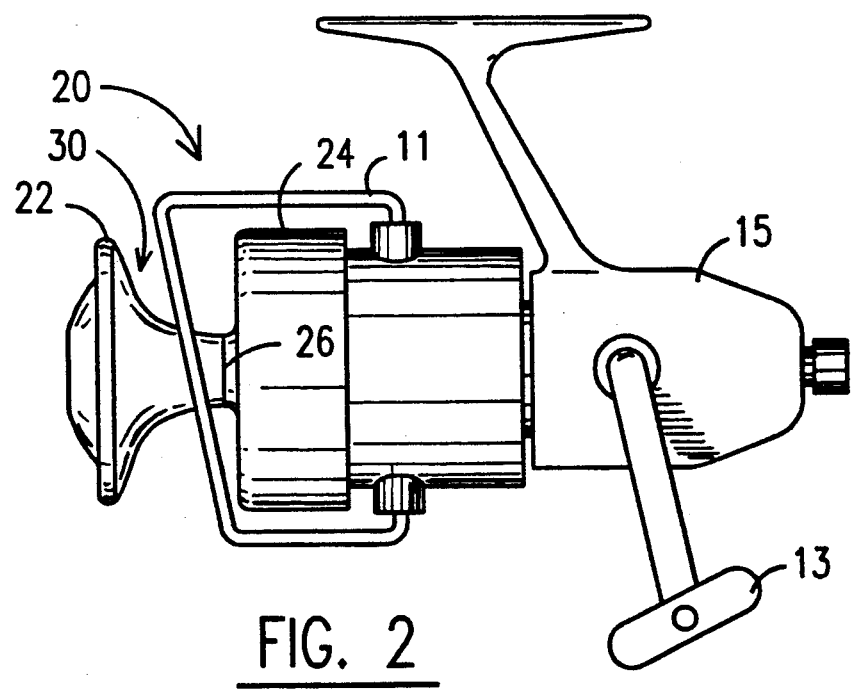
FIG. 2 is a side elevational view of an illustrative embodiment of the present invention in its assembled configuration.
Figure 3:
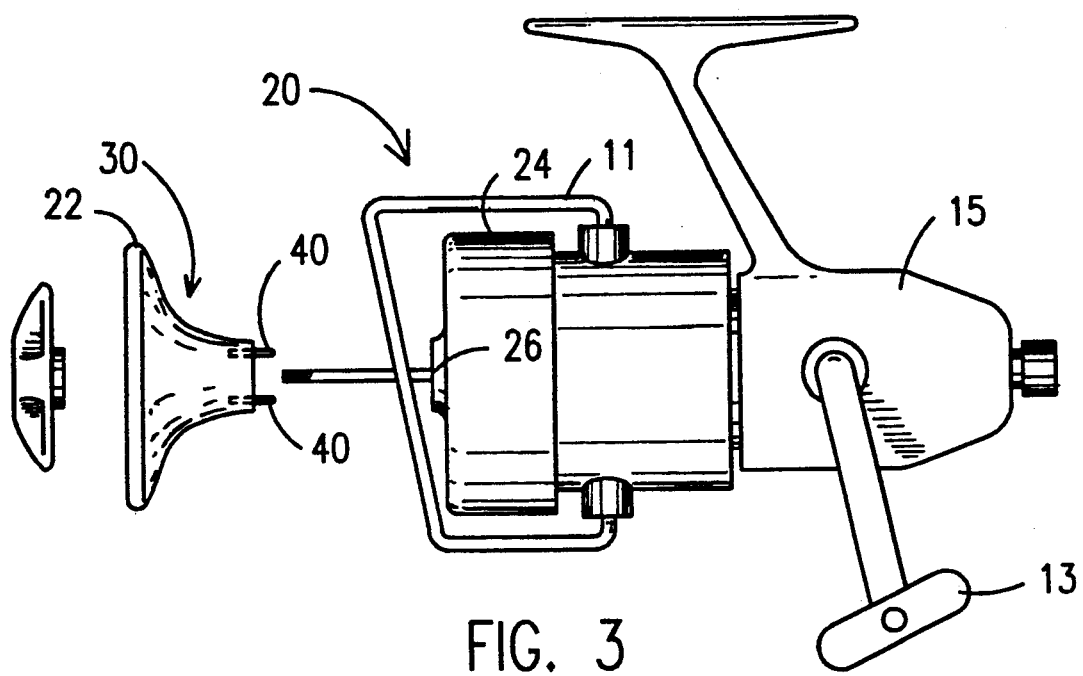
FIG. 3 is a side elevational view of the embodiment of FIG. 2 in its open configuration.

The improved spool is shown in FIGS. 2 and 3 and is denoted 20 as a whole.

Spool 20 has a two part construction. First part 22 and second part 24 abut one another at transverse parting line 26. The parts are preferably cast as two separate parts at the time of manufacture, although theoretically they could be made as a single part and then cut by a suitable cutting means. Parting line 26 is remote from the end plate of first part 22 and is disposed in closely spaced relation to the end plate of second part 24. Note that the smallest diameter of the central part of the spool is coincident with said parting line.

The region denoted 30 indicates how the conventional spool of FIG. 1 is further modified to give the central part thereof a parabolic or hyperbolic contour. More particularly, the spool has a parabolic contour between the outermost end plate (the end plate of first part 22) and parting line 26. Note that this makes the spool asymmetric relative to said parting line. Although a prototype of the novel spool can be built by applying glass fiber, synthetic rubber, or other suitable material to a conventional spool until the built up area 30 is formed, it is preferable to manufacture the novel spool so that it has the parabolic contour built in. Die casting and other manufacturing methods may be employed to produce the parabolic contour. Note that the diameter of each end plate exceeds even the largest diameter of the central part.

Figure 4:
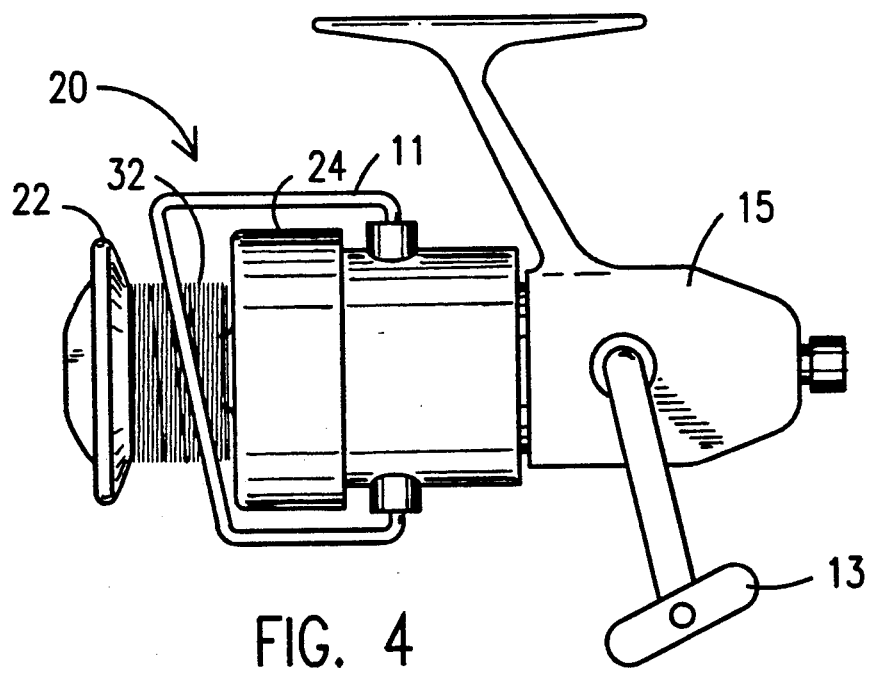
FIG. 4 is a view similar to FIG. 2, but including a line to be removed shown in coiled configuration about the novel spool.
Figure 5:
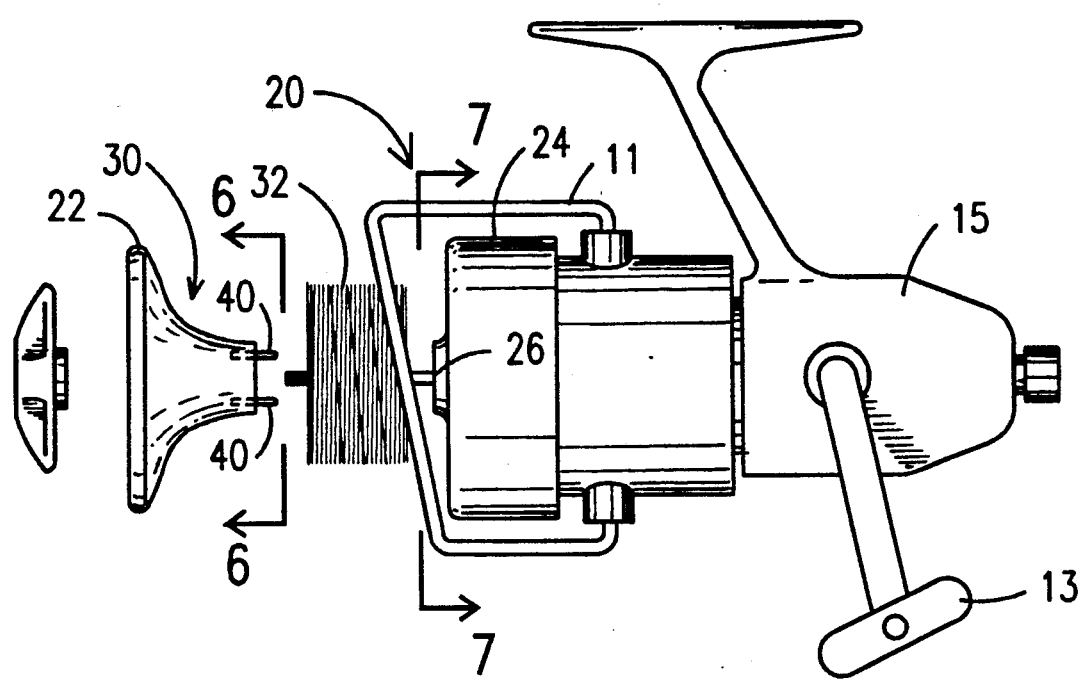
FIG. 5 is a view similar to FIG. 3, but further illustrating an old line in tightly coiled configuration as it is removed from the novel spool.

FIG. 4 shows an old line 32 coiled about the novel spool, and FIG. 5 shows the two parts of the spool after they have been separate from one another so that said old line 32 can be removed; note that said old line 32 remains tightly wound even when removed. If a conventional spool is cut into two separate parts to enable line coiled thereabout to be removed therefrom, the coiled line does not remain neatly and tightly coiled upon separation of the two parts. Thus it is apparent that the parabolic contour of the novel spool 20 is responsible for the maintenance of the coiled configuration when old line is removed therefrom.

The time required to reel in the line is about all the time that is needed to remove the old line from the conventional spool, i.e., the entire removal process takes only a few moments.

Any number of snap together or other quick fastening and quick release means may be employed to releasably hold together the two parts of the novel spool. Moreover, any number of quick release means may be employed to permit facile separation of the two parts when the coiled line is to be removed.

Figures 6, 7:
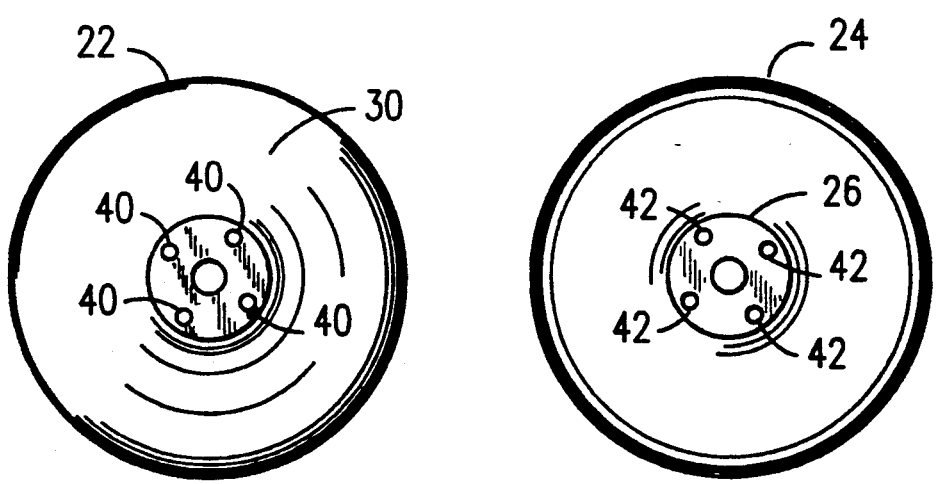
FIG. 6 is an end view taken along line 6—6 in FIG. 5.
FIG. 7 is an end view taken along line 7—7 in FIG. 5.

The particular fastening means and release means illustrated will therefore be perfunctorily described as such means could be easily replaced with suitable equivalent means. Prongs 40, for example, may be slidably received within sockets 42 (FIG. 7), as perhaps best understood by comparing FIGS. 5-7. The prongs could be press fit into the sockets, or a slight relative rotation in a first direction could be required to lock part 22 to part 24 and a reverse rotation could be required to unlock said parts.

No mathematical technique has been employed to determine the exact formula for the parabolic or hyperbolic contour of the novel spool that is illustrated herein. Empirical studies may even show that a different profile of spool 20 provides an even tighter or smaller coil of line. However, the depicted contour works as well as is needed to produce the desirable tightly wound coil.

This invention is clearly new and useful. Moreover, it was not obvious to those of ordinary skill in this art at the time it was made, in view of the prior art when considered as a whole in accordance with the requirements of law.

Moreover, this invention pioneers the art of mechanical devices for removing fishing line from spools. It also pioneers the broader art of removing any flexible line, cable, or other string-like object from a drum, spool, reel, or other base means about which it is wound. Accordingly, the claims that follow are entitled to broad interpretation, as a matter of law, to protect from piracy the heart or essence of this breakthrough invention.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A fishing reel apparatus of the type having a housing, a spool, means for mounting the spool non-rotatingly to the housing, a line coiling means rotatably mounted to the housing for coiling a fishing line around the spool, and a handle rotatably mounted to the housing for rotating said line coiling means, said spool comprising:

a central part having a predetermined, non-uniform diameter;

an end plate disposed at each end of said central part;

said end plates having a common diameter greater than the non-uniform diameter of said central part;

said spool having a first part and a second part of independent structure;

said first part including a first part of said central part and a first end plate;

said second part including a second part of said central part and a second end plate;

said first and second parts of said spool being disposed in abutting relation to one another when the spool is in its assembled configuration;

quick release means for detachably securing said first and second parts to one another;

a parting line formed between said first and second parts where said first and second parts about one another;

said first and second parts being separable from one another along said parting line;

said parting line being positioned remote from said first end plate and in closely spaced relation to said second end plate;

said non-uniform diameter being greatest at said first end plate and said non-uniform diameter being smallest at said parting line;

said central part of said spool having a parabolic contour between said first end plate and said parting line; and said central part of said spool being asymmetrical relative to said parting line;

whereby a line is coilable about said spool such that said line collects primarily near said second end plate and is therefore removable in a few moments from said spool with the coil intact.

* * * * *